US006349979B1

(12) United States Patent
Noel et al.

(10) Patent No.: US 6,349,979 B1
(45) Date of Patent: Feb. 26, 2002

(54) INTEGRAL THREADED ASSEMBLY OF TWO METAL TUBES

(75) Inventors: Thierry Noel, Sebourg; Emmanuel Varenne, Valenciennes, both of (FR)

(73) Assignee: Vallourec Mannesmann Oil & Gas France, Aulnoye-Aymeries (FR)

( * ) Notice: Subject to any disclaimer, the term of this patent is extended or adjusted under 35 U.S.C. 154(b) by 0 days.

(21) Appl. No.: 09/581,170

(22) PCT Filed: Oct. 11, 1999

(86) PCT No.: PCT/FR99/02427

§ 371 Date: Jun. 13, 2000

§ 102(e) Date: Jun. 13, 2000

(87) PCT Pub. No.: WO00/22339

PCT Pub. Date: Apr. 20, 2000

(30) Foreign Application Priority Data

Oct. 13, 1998 (FR) ........................................... 98 12961

(51) Int. Cl.[7] .......................... F16L 15/06; F16L 25/00

(52) U.S. Cl. .................... 285/333; 285/334.1; 285/383

(58) Field of Search ............................... 285/333, 334, 285/334.1, 334.2, 383

(56) References Cited

U.S. PATENT DOCUMENTS 2,239,942 A * 4/1941 Stone et al. ............ 285/333 X
4,521,042 A 6/1985 Blackburn et al.
4,538,840 A * 9/1985 DeLange .................... 285/333
4,984,829 A * 1/1991 Saigo et al. ................ 285/383
5,505,502 A * 4/1996 Smith et al. ................ 285/334
6,010,163 A * 1/2000 Cerruti ....................... 285/333

FOREIGN PATENT DOCUMENTS

DE 40 35 684 5/1992
EP 0 648 967 4/1995
FR 1 436 319 3/1966
FR 2 364 322 7/1978

OTHER PUBLICATIONS

VAM Catalog, No. 940, pp. 1–57, Mar. 1997.

* cited by examiner

*Primary Examiner*—Neill Wilson
(74) *Attorney, Agent, or Firm*—Oblon, Spivak, McClelland, Maier & Neustadt, P.C.

(57) ABSTRACT

An integral threaded connection of two metal tubes includes a male element and a female element, each of the elements including a bearing surface, a tapered threading, a sealing surface, and an end surface. The end and bearing surfaces are flat and perpendicular to the XX connection axis. The male sealing surface is separated from the male threading by a lip that has an external tapered lip surface whose amount of taper is equal to that of the male threading and has a generatrix which is substantially a roughly extension of the tangent to the male thread roots. The distance between the end and bearing surfaces of a same element is adapted to the corresponding distance on the other element so that at the end of connection, the inner pair of bearing surfaces is abutted first.

12 Claims, 3 Drawing Sheets

INTEGRAL THREADED ASSEMBLY OF TWO METAL TUBES

BACKGROUND OF THE INVENTION

1. Field of the Invention

The invention concerns integral-type threaded connections of two metal tubes.

2. Discussion of the Background

Integral threaded connections involve a male element, provided at the end of a first tube, connected to a female element provided at the end of a second tube without any intermediate sleeve-type part.

Such integral threaded connections are known, especially for use in assembling columns of production or liner tubes or of drill-rod strings in oil or gas wells or in similar wells, such as wells for geothermal power.

U.S. Pat. No. 4,521,042 describes an integral threaded connection provided with:

- cylindrical male and female threads with two radially distinct stages;
- three pairs of transversal annular surfaces, one being a middle pair between the two thread stages, one an outside pair toward the female free end and one an inside pair toward the male free end;
- and three pairs of conical sealing surfaces, one toward the male free end, one toward the female free end and one comprised by the middle pair of transversal surfaces.

Each pair of transversal surfaces or of sealing surfaces is comprised of two mating surfaces, one being on the male element and the other on the female element.

The transversal surfaces of the middle pair of transversal surfaces are braced against the connection and have the function of absorbing the tightening torque, of imposing tension on the threads, of ensuring central sealing and of defining the final connection position for the sealing surfaces.

The inside and outside pairs of transversal surfaces provide reinforcement for the middle pair in the event of overtightening or of overload during service.

In the remainder of the present description, bearing surfaces are defined as such transversal surfaces which are in braced relationship or which have the potential to be in braced relationship. These bearing surfaces have substantially transversal orientation relative to the axis of the connection, and they can be ends of tubes or can originate from shoulders on the inside surface of the female element or on the outside surface of the male element.

The terms "transversal" and "longitudinal" relate in the rest of the present description to the direction of the axis of the connection.

The middle pair of bearing surfaces is thus comprised of very open conical surfaces, which are convex on one element and concave on the other, such that they generate radial stresses while they are being brought into braced relationship.

The sealing surfaces are organized into pairs of male and female surfaces, which interfere radially, one against the other, with high metal-to-metal contact pressure. These pairs are designed to ensure sealing of the column with respect to the internal fluid and/or with respect to the external medium, even when the fluid pressures are high.

The diametrical interference between paired reference points of two rotational surfaces of a connection is generally defined as the difference in diameter between these points measured when the elements are not joined. The diametrical interference is counted positively when the surfaces, once joined, interfere radially with each other and develop contact pressure, the contact pressure being roughly proportional to the diametrical interference.

A connection such as the one described in patent U.S. Pat. No. 4,521,042 is costly to produce for various reasons:

The production of the male and female elements, generally by machining, is necessarily a lengthy process given the complex geometry to be produced and the precision necessary for the connection to function properly.

For example, the production of overhanging shoulders with concave bearing surfaces and acute angles at the foot of the shoulders is delicate and may require the use of specific machining stages and/or special tools.

Furthermore, synchronization of the action of multiple surfaces and stop devices to achieve proper, reproducible functioning of the connection is not obvious.

Improper functioning of the connection can be due to poorly chosen dimension figures particularly considering the plastic deformations of the male and female elements when they are joined.

Non-reproducible functioning of the connection can be due to poorly chosen dimensional figures particularly considering the manufacturing tolerances.

Finally, in order to house the two stages of threading and the various bearing surfaces, production of the male and female elements generally requires tubes whose ends have been upset, for example by forging, compared to the bodies of the tubes, which is a relatively costly operation.

Another integral-type threaded connection called "VAM® ACE XS" is described on pages 28 to 31 of the VAM Catalogue No. 940 published in July 1994 by Vallourec Oil & Gas.

On the male element, moving toward the end of the first tube, the connection of two tubes described in this document has an outer shoulder with a flat, annular bearing surface perpendicular to the connection axis, tapered male threading with trapezoidal threads tapered 1/16 (6.25%) on the diameter, a cylindrical connecting lip beyond the threading and a tapered male sealing surface tapered 10% on the diameter. The end surface of the male element, which is also the end surface of the tube, is a slightly concave tapered surface, the points of this surface in the area of the sealing surface being slightly prominent when compared to those located in the area of the inner surface of the tube.

On the female element, moving toward the end of the second tube, the connection has an inner shoulder with a slightly tapered convex bearing surface whose amount of taper corresponds to that of the end surface of the male element, a tapered female sealing surface whose amount of taper corresponds to that of the male element and tapered female threading with trapezoidal threads that is complementary to the threading of the male element. Beyond the threading, the female element ends in an end surface perpendicular to the connection axis.

When these two tubes are joined, the external threading of the male element is screwed into the internal threading of the female element, the end surface of the male element forms an inner pair of abutted bearing surfaces with the bearing surface of the female element, the end surface of the female element forms an outer pair of abutted or roughly abutted bearing surfaces with the bearing surface of the male element, and the male sealing surface interferes radially with the female sealing surface.

Owing to its two pairs of bearing surfaces, this type of connection makes it possible to impart a very high make-up torque and to obtain good compression and bending strength. Nevertheless, this type of connection remains rather costly to produce if one wants it to function properly and in reproducible fashion.

FR 2 364 322 describes yet another integral threaded connection whose general arrangement is quite similar to the "VAM® ACE XS" connection having a shoulder on each element with an annular bearing surface, tapered threading, a sealing surface, and an annular end surface wherein the male sealing surface is located between the male threading and annular end surface while the female sealing surface is located between the female annular bearing surface and threading.

The connection described in patent FR 2 364 322 differs from the "VAM® ACE XS" by the presence on each element of a second sealing surface at the end of the element and by the fact that the pair of tapered bearing surfaces can be either the inner pair or the outer pair depending on the anticipated service conditions.

According to the document FR 2 364 322, the sealing surface on the side of the end is rounded and the sealing surface on the side of the shoulder is tapered; the rounded sealing surface of one element cooperates with the tapered sealing surface of the other element to form a pair of sealing surfaces.

The surfaces of the pair of tapered bearing surfaces are abutted first during screwing to take advantage of the relative flexibility of this type of stop device and to amplify the contact pressure of the pair of sealing surfaces closest to the pair of tapered bearing surfaces.

The pair of flat bearing surfaces serves as a reinforcement and constitutes a very stiff safety stop, all the more so because their surface area is greater than the surface area of the pair of tapered bearing surfaces.

So that the pair of tapered bearing surfaces abuts first during make-up, the patent provides that the distance between the end surface and the bearing surface of the element whose end surface is tapered is greater by 0.05% to 0.25% than the corresponding distance on the other element.

This type of connection is also costly to produce.

SUMMARY OF THE INVENTION

With the present invention, we sought to produce an integral threaded connection with tapered threads, two pairs of bearing surfaces, and at least one pair of sealing surfaces whose geometry is optimized but that is economical to produce.

More particularly, we sought to induce maximum contact pressure at the sealing surfaces.

We also sought to achieve good operational synchronization of the two pairs of bearing surfaces by privileging the abutment during connection of one pair of bearing surfaces, always the same.

We also sought to use sealing surfaces that are less susceptible to seizing.

All these properties are basically obtained by combining the features of claim 1 of this invention.

The integral threaded connection of two metal tubes in accordance with the invention comprises a male element at the end of a first tube and a female element at the end of a second tube.

The male element comprises, moving toward the free end of the first tube:

- an outer shoulder with an annular bearing surface called "male outer,"
- an external tapered threading called "male threading,"
- an outer sealing surface called "male sealing surface,"
- and an annular male end surface that is also the end surface of the first tube.

The female element comprises, moving toward the free end of the second tube:

- an inner shoulder with an annular bearing surface called "female inner,"
- an inner sealing surface called "female sealing surface" adapted to the male sealing surface,
- internal tapered threading called "female threading" complementary to the male threading,
- and an annular female end surface that is also the end surface of the second tube.

The male threading is screwed into the female threading.

The male sealing surface interferes radially with the female sealing surface.

The male end surface forms an inner pair of bearing surfaces with the female inner bearing surface and the female end surface forms an outer pair of bearing surfaces with the male outer bearing surface.

The end and bearing surfaces of each male and female element are flat surfaces positioned perpendicular to the connection axis.

The male sealing surface is separated from the male threading by a lip that has an external tapered surface whose magnitude of taper is equal to that of the male threading and whose generatrix is roughly in line with the tangent to the roots of the thread of the male threading while remaining on the side of the connection axis with respect to a line tangential to said male thread roots.

The surface of the male sealing surface is interior or tangent to the surface extending the tapered lip surface.

The distance between the male end surface and the male outer bearing surface is adapted to the distance between the female end surface and the female inner bearing surface so that during screwing the inner pair of bearing surfaces are abutted first.

This type of configuration makes it possible to protect the male sealing surface from blows likely to cause the connection to leak, to increase the functional features of the connection, to make this operation reproducible and reliable, and to simplify production of the elements all at the same time.

Preferably, the distance between the generatrix of the tapered lip surface and the tangent to the roots of the male threads is less than or equal to 0.20 mm.

Also preferably, the amount of taper of the male and female threads compared to the diameter is between 6.25% and 20%.

Preferably again, the male sealing surface is a tapered surface coaxial to the tapered lip surface and with a greater amount of taper than this lip surface and the female sealing surface is also a tapered surface with an amount of taper roughly identical to that of the male surface.

Very preferably, the amount of taper of the male sealing surface compared to the diameter is between 25% and 75%.

Preferably, the male and female threads are each formed by a single threaded portion.

In a more costly variation, they can each be formed by two-stepped threaded portions, the tapered lip surface then being roughly in line with the threaded portion of the male threading to which it is adjacent.

Preferably, the surfaces of the outer pair of bearing surfaces are abutted against each other on the connection like the surfaces of the inner pair of bearing surfaces. The first pair of bearing surfaces to be abutted, i.e., the inner pair of bearing surfaces, absorbs the major portion of the effective make-up torque; the outer pair of abutted bearing surfaces absorbs the remainder of the make-up torque.

Alternatively, the surfaces of the outer pair of bearing surfaces are almost in contact with each other on the connection.

This means that the surfaces of the outer pair of bearing surfaces are less than one-tenth of a mm apart.

Whether the surfaces of both pairs of bearing surfaces are abutted on the connection or only those of the inner pair of bearing surfaces, the outer pair of bearing surfaces abutted or almost in contact is there as an immediate reinforcement in order to absorb the residual screwing stresses or the supplementary service stresses without risking plasticizing the metal of the elements.

Advantageously, in order to ensure that the inner pair of bearing surfaces abuts first during screwing, prior to joining, the distance between the male end surface and the male outer bearing surface is slightly longer by a determined deviation ΔL than the distance between the female end surface and the inner female bearing surface.

Preferably, the deviation ΔL is a decreasing linear function of the outer diameter of the tubes of the connection and an increasing linear function of their thickness.

The invention also concerns a machining production process for the integral threaded connection targeted by the invention in which both the end and bearing surfaces of a given element are machined during the same machining stage.

This type of process makes it possible to obtain good precision with respect to the distance between these two surfaces.

Advantageously, in the case of machining the male element, the tapered lip surface and the tapered surface that encases the thread crests of the male threading can be machined during the same machining stage.

BRIEF DESCRIPTION OF THE DRAWINGS

The following figures illustrate a particular and preferred mode of embodiment of the invention.

DESCRIPTION OF THE PREFERRED EMBODIMENTS

Figures 1, 2, 3:
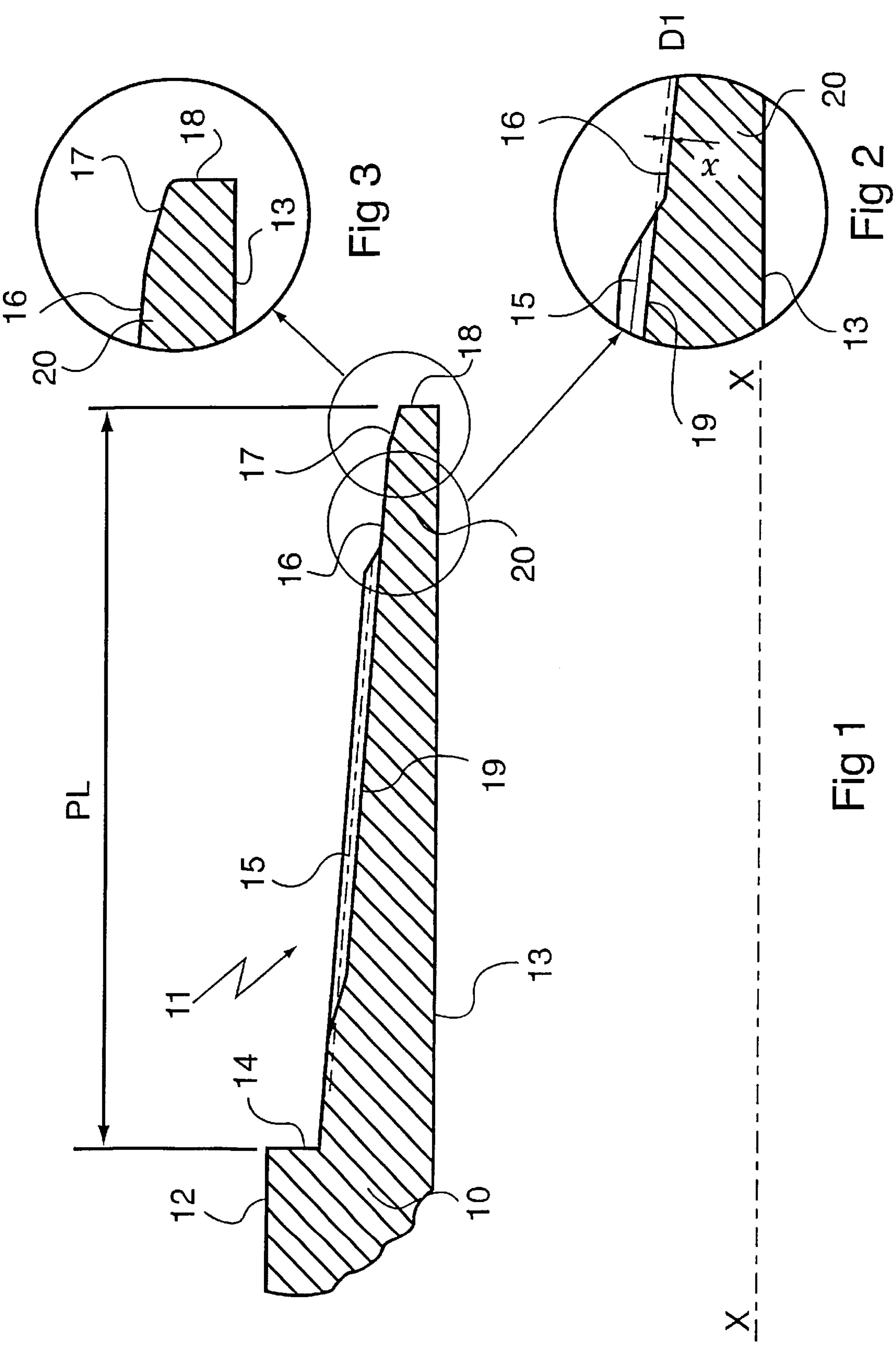
FIG. 1 shows a sectional view of a male element designed to produce an integral threaded connection of two metal tubes in accordance with this invention.
FIG. 2 shows a detail of FIG. 1.
FIG. 3 represents another detail of FIG. 1.

FIG. 1 shows the end area of a cylindrical metal revolution tube (10) on which a male element (11) has been produced on the outside.

This end area may be of the same thickness as the body of the tube (10) or, if necessary, has been upset, for example by forging; the diameter of the outer peripheral surface (12) of the end area can also be greater than that of the body of the tube and/or the diameter of the inner peripheral surface (13) of the end area may be smaller than the diameter of the body of the tube.

The tube (10) is designed to be joined to a second tube (30) to form an integral threaded connection (100), the male element (11) of the first tube (10) being joined to the female element (31) provided at the end of the second tube (30).

Externally, the male element (11) comprises moving toward the end of the tube (10). An extension of the outer peripheral surface (12) forms an outer shoulder with a male outer bearing surface (14) that is flat, annular, and perpendicular to the XX connection axis. Beyond this shoulder, a tapered connection surface with the male threading is provided that will be described later on. Beyond this connection surface, the male external tapered threading (15) is provided.

Specification API 5B (Specification for Inspection of Pipe Threads) published by the American Petroleum Institute (API) gives examples of these types of tapered threads with triangular, round or trapezoidal threads.

Preferably trapezoidal threads will be used and more particularly half dovetail or negative load flank angle threads such as those of the connection on p. 28–29 of the VAM Catalogue No. 940 already cited.

A higher thread taper than the standard API 513 (6.25%) taper, for example a 15% taper as a percentage of the diameter can also be chosen. Later on the advantage of such an amount of taper for the features of the connection is explained.

The tapered connection surface between the outer bearing surface (14) and the male threading (15) is roughly in the extension of the cone of the thread crests and inside this cone.

d) Beyond the threading, a lip (20) that separates the male threading (15) from the male sealing surface (17).

Externally this lip has a tapered lip surface (16) whose amount of taper is equal to that of the male threading (15) and whose generatrix is roughly in the extension D1 of the tangent (19) to the thread roots of the male threading (15) remaining inside said extension D1.

This means that the generatrix of the tapered lip surface (16) is positioned slightly on the side of the XX connection axis, the distance x between this generatrix and the extension D1 of the tangent (19) to the thread roots being less than or equal to 0.20 mm and preferably close to 0.05 mm.

The positioning of the tapered lip surface (16) allows one to machine this surface (16) and the tapered surface encasing the thread crests of the male threading (15) during the same machining stage and therefore to produce the male element economically.

The small gap x between the generatrix of the tapered lip surface (16) and the extension D1 of the tangent (19) to the thread roots of the male threading (15) also makes it possible to release the cutting tool without catching any surface at the end of machining of the male threading (15).

e) Beyond the tapered surface (16), a male sealing surface (17), tapered, coaxial to the tapered lip surface (16) but with a greater amount of taper than this tapered lip surface.

The taper of the male sealing surface (17) with respect to the diameter is, for example, 50% compared to 15% for the tapered surface (16).

The male sealing surface (17) is thus inside the surface extending the tapered lip surface (16).

The male sealing surface (17) extends to the end of the tube (10), which is formed by an annular, flat male end surface (18) perpendicular to the connection axis.

In a variant that is not shown, the male sealing surface (17) can be connected in known manner to the male end surface (18) by a chamfer or by a toric surface.

The male end surface (18) joins up with the inner peripheral surface (13) of the tube (10).

The fact that these outer bearing (14) and end (18) surfaces are flat and perpendicular to the connection axis allows economical machining of the male element (11).

The geometric configuration of the male element (11) is particularly advantageous in that one Gan produce the male end surface (18), the tapered lip surface (16), the tapered surface encasing the thread crests of the male threading (15) and the male outer bearing surface (14) in a single machining stage. The result is great economy in producing the male element (11) and excellent precision concerning the distance PL between male end surface (18) and male outer bearing surface (14). Later on we shall see the advantage in maintaining good precision for the PL dimension.

Figures 4, 5:
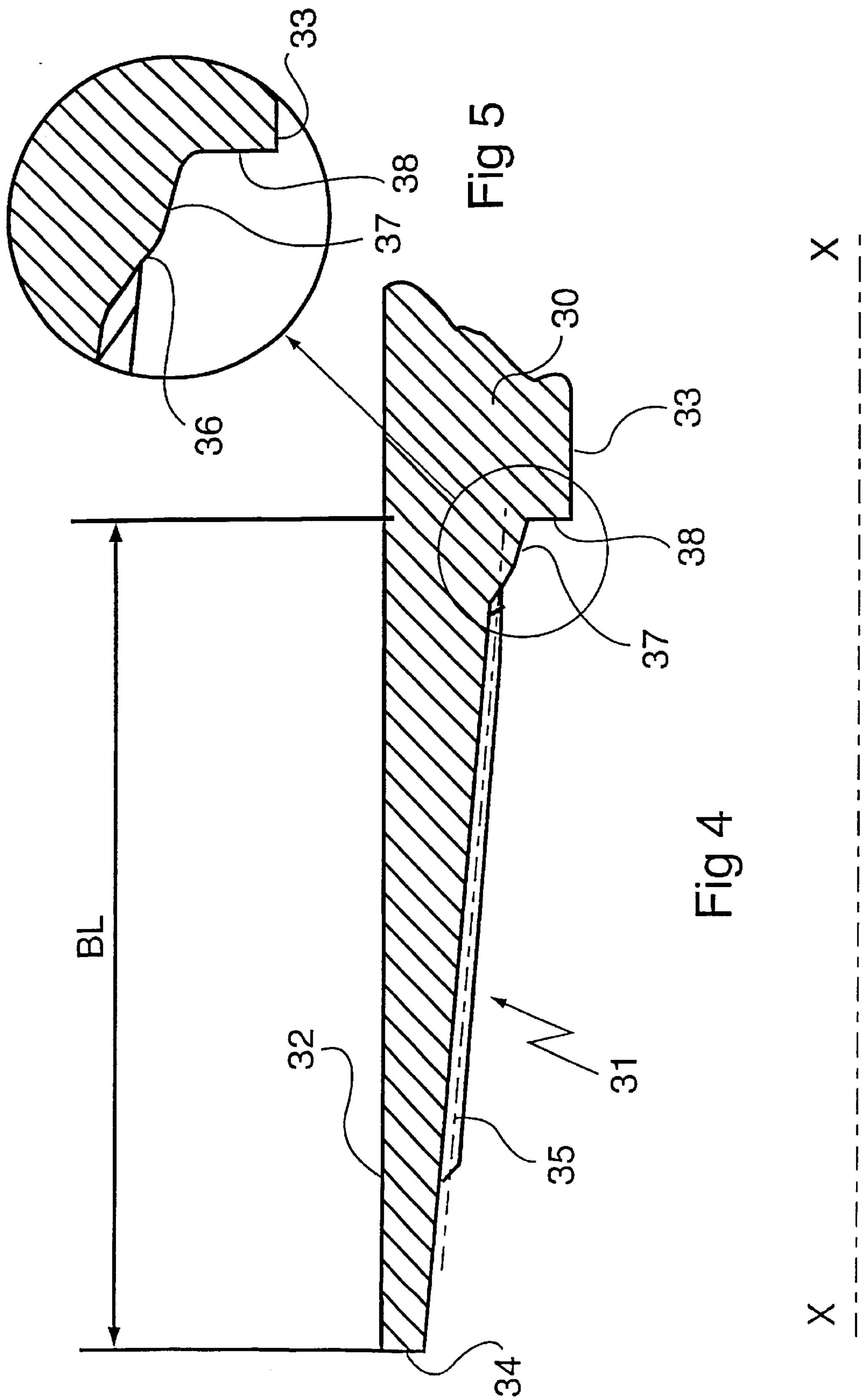
FIG. 4 shows a sectional view of a female element designed to form an integral threaded connection of two metal tubes with the male element of FIG. 1 in accordance with the invention.
FIG. 5 shows a detail of FIG. 4.

FIG. 4 shows the end area of the second metal tube (30) on which an internal female element (31) has been produced.

This end area can be of the same thickness as the body of the tube (30) or, if necessary, have been upset, for example by forging; the diameter of the outer peripheral surface (32) of the end area may then be greater than the diameter of the body of the tube and/or the diameter of the inner peripheral surface (33) of the end area may be smaller than the diameter of the body of the tube.

The female element (31) comprises internally, moving toward the end of the tube (30):

a) A horizontal thrust of the inner peripheral surface creating an inner shoulder with an annular flat female inner bearing surface (38) perpendicular to the XX connection axis.

b) Beyond this shoulder, a tapered female sealing surface (37) complementary to the male sealing surface (17).

c) An unthreaded connection zone with the female threading (35).

d) Tapered female threading complementary to the male threading (15).

e) An unthreaded portion beyond the female threading (35), tapered, roughly in line with the cone tangent to the thread roots of the female threading (35), for example slightly outside this cone.

This unthreaded portion extends to the end of the tube (30), which is formed by a female end surface (34) that is annular, flat, and perpendicular to the connection axis.

The female end surface (34) joins up with the outer peripheral surface (32) of the tube (30).

The fact that the inner bearing (38) and end (34) surfaces are flat and perpendicular to the connection axis allows economical machining of the female element (31).

The remarks above concerning machining economy and precision made with regard to the arrangement of the male element (11) applies to the female element (31), the dimension BL between the female end surface (34) and the female inner bearing surface (38) being maintained with precision owing to the fact that the surfaces (34) and (38) are machined during the same machining stage.

Figure 6:
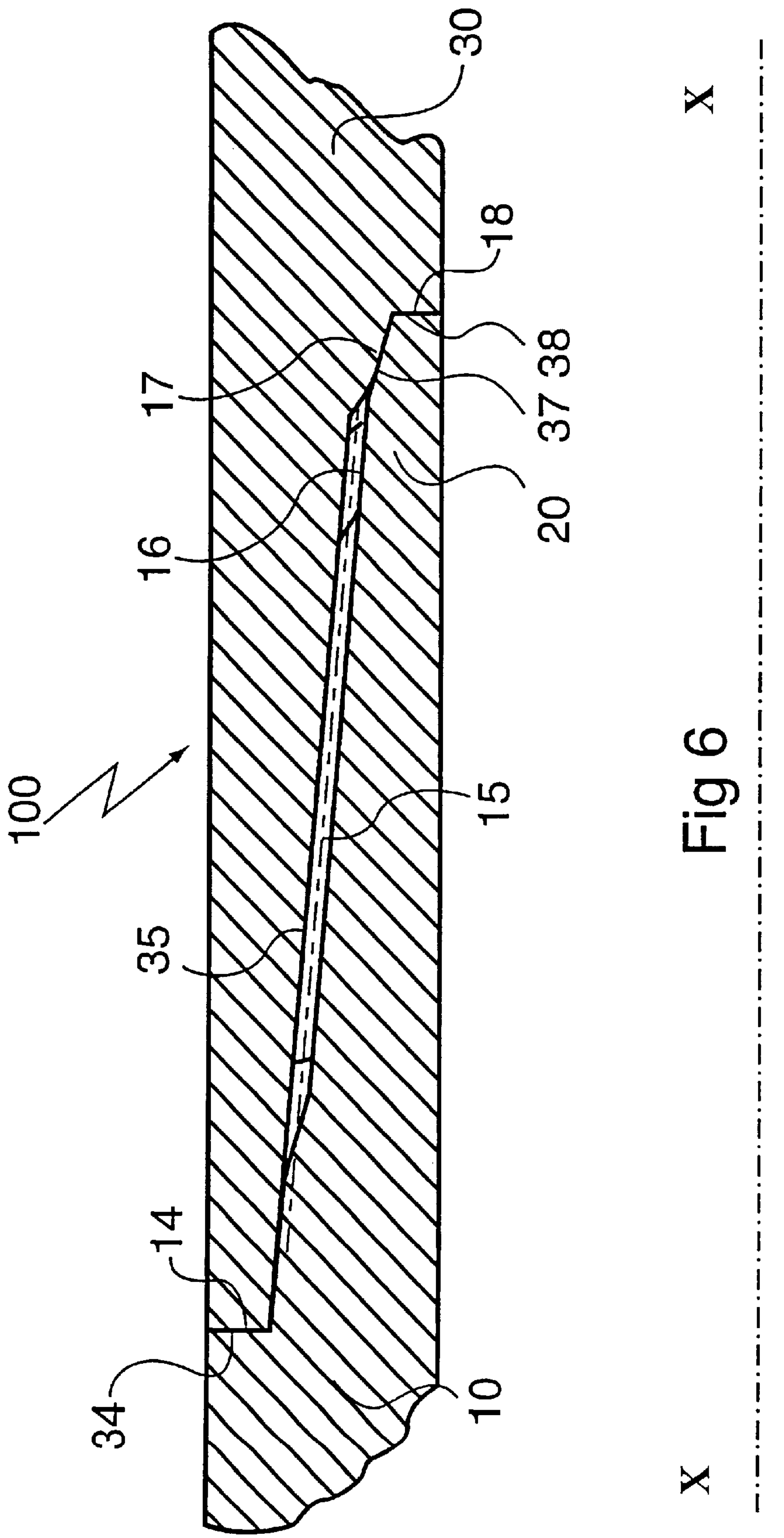
FIG. 6 is a sectional view of the connection produced with the elements of FIGS. 1 and 4.

FIG. 6 shows the connection (100) between the metal tubes (10) and (30).

Advantageously the diameter of the outer peripheral surface (12) of the tube (10) is equal to the diameter of the outer peripheral surface (32) of the tube (30) and the diameter of the inner peripheral surface (13) of the tube (10) is equal to the diameter of the inner peripheral surface (33) of the tube (30) so that the peripheral surfaces of the tubes do not have any thrust at their junction.

The male threading (15) is screwed into the female threading (35).

Advantageously, when the connection is made-up, the crests of the female thread interfere radially with the roots of the male threads, the diametrical interference being approximately 0.1 mm, for example.

The male sealing surface (17) interferes radially with the female sealing surface (37) with diametrical interference values of several tenths of mm between these sealing surfaces.

The lip (20) at the end of the tube (10) forms a sort of flexible beam fixed at the threading (15).

The diametrical interference applied at the male sealing surface (17) induces a deflection of the end of the lip (20) and, given the geometry of the beam, high contact pressure on the male/female sealing surfaces (17, 37) and bending stresses in the sealing surface.

The tapered arrangement of the lip surface has multiple advantages:

First, the fact that the tapered lip surface (16) is located almost in the extension D1 of the tangent 19 to the thread roots of the male threading (15) but slightly shifted by x toward the connection axis and that the surface of the male sealing surface (17) is inside the surface extending the tapered lip surface (16) has the major advantage that, during presentation of the tubes (10, 30) from their screwing to their connection, the male and female sealing surfaces (17, 37) are protected from blows that might otherwise damage them.

Additionally, the 15% taper of the male threading (15) and the lip surface (16), higher than the standard thread taper in accordance with specification API 5B (=6.25%) gives the lip (20) a shape that allows it to come close to that of a beam isoresistant to bending where ideally the material is distributed so as to have the same bending strength in each section.

The shape of the lip (20) differs from the shape of an ideally beam isoresistant to bending that tapers off at its free end; such a shape does not allow one to position a tapered sealing surface beyond the lip (20) and ensure sufficient resistance to the axial compression of the male end surface (18) that abuts against the female inner bearing surface (38).

Lip surface shapes other than tapered also allow protection of the male sealing surface from blows: effectively, it suffices that the largest circle of the male sealing surface (17) be inside or tangent to the tapered surface created by the rotation of the straight line D1. The lip surface could, for example, be cylindrical with a diameter equal to that of the large circle of the male sealing surface (17), but then the thickness of the metal of the lip at the end of the threading (15) would result in a more flexible lip and therefore in less contact pressure than the tapered lip surface (16) of the present invention. It has also been shown that a lip (20) with a tapered lip surface (16) in accordance with the invention increases the effective contact length of the male and female sealing surfaces (17, 37) and the contact pressure. Numerical values supporting these points will be presented later on in the examples.

Finally, the virtual alignment of the generatrix of the tapered lip surface (16) with the straight line D1 limits the concentrations of stresses created by geometric discontinuities, concentrations of stresses that would otherwise oblige one to limit the value of the contact pressure so that a critical level of stress is not attained at the connection between the lip (20) and the end of the male threading (15).

The small gap x, limited to 0.20 mm and preferably equal to 0.05 mm, between the generatrix of the tapered lip surface (16) and the straight line D1 does not increase the stress concentration factor appreciably while it provides the advantages described previously.

On the female element (31) the connection area (36) between the sealing surface (37) and female threading (35)

has a geometry such that it does not touch the tapered lip surface (16) of the male element (11) during connection while it allows easy disengagement of the tool during machining of the female threading (35).

The male end surface (18) forms an inner pair of bearing surfaces with the female inner bearing surface (38) and the female end surface (34) forms an outer pair of bearing surfaces with the male outer bearing surface (14).

The distances, on the one hand PL between the male end surface (18) and the male outer bearing surface (14), on the other hand BL between the female end surface (34) and the female inner bearing surface (38) were designed so that at the end of connection, abutment occurs systematically first between the inner pair (18, 38) of bearing surfaces and not between the outer pair (14, 34) of bearing surfaces.

Once the connection has been made-up, the female end surface (34) of the outer pair of bearing surfaces is abutted against the male outer bearing surface (14) or is almost in contact with it.

According to the inventors, the fact of privileging the abutment of the surfaces (18, 38) of the inner pair of bearing surfaces that is the closest to the sealing surfaces (17, 37) allows one to define more precisely the relative position of the sealing surfaces (17, 37) at the end of connection and consequently their diametrical interference.

Such precision is all the more necessary when relatively inclined sealing surfaces (17, 37) (amount of taper=50% on the diameter) are being used.

Inclined surfaces of this type are less sensitive to seizing and can therefore withstand high contact pressures but low rotation during screwing leads to great variation in diametrical interference.

Both pairs of bearing surfaces can be abutted at the end of screwing because one endeavored to apply a very high make-up torque in the connection either in the case of accidental over-torquing during screwing or as a result of the production tolerances for the elements (11, 31); the inner pair then absorbs the major portion of the make-up torque and the outer pair absorbs the remainder.

Whether both pairs of bearing surfaces are abutted after screwing or only the inner pair to(18, 38) of bearing surfaces, the outer pair (14, 34) of bearing surfaces abutted or almost in contact is there to provide immediate reinforcement for absorbing the stresses due to screwing or those additional stresses during service without risking plasticizing the metal of the elements.

When the connection is subjected during service to axial compression or plane bending stresses, for example, additional force is placed on the pairs of abutted bearing surfaces but also on the lip and on the sealing surfaces, which must not be deformed plastically, which would result in a risk of sealing loss and seizing after unscrewing-rescrewing.

To allow this type of functional synchronization of the two pairs of bearing surfaces, the distance PL between the male end surface (18) and the male outer bearing surface (14) is, prior to connection, slightly longer than the distance BL between the female end surface (34) and the female inner bearing surface (38) by a determined value ΔL.

The difference ΔL=PL–BL depends on many physical (Young's modulus, Poisson's coefficient, elastic limit of the material) and geometric (diametrical interference on the threading, diametrical interference on the sealing surfaces, thickness of the lip, male sealing surface diameter, male and female critical sections, etc.) parameters.

Given the relations between these various geometric characteristics, the inventors succeeded in showing that, for a same material, the value ΔL increases in linear fashion with the thickness of the tubes and decreases with their outer diameter:

$$\Delta L = a*T - b*OD + c$$

T being the thickness of the tubes, OD being the outer diameter of the tubes, a, b and c being positive constants.

Advantageously, the male (11) and female (31) elements can be machined in the re-cut ends of tubes containing damaged male and female elements of the prior art, for example two-stage cylindrical threaded elements.

We shall now give several examples to support the claims for enhanced performance of connections in accordance with the invention compared to state of the art connections.

EXAMPLE 1

Comparison of a connection of tubes in accordance with the invention having an outer diameter of 101.6 mm (4") and a thickness of 4.83 mm (connection A1) with a connection B of tubes of the same dimensions in accordance with the state of the art from an inertia standpoint (or stiffness in bend).

| | Connection 1 | Connection B |
|---|---|---|
| Thread taper | 15% | 6.25% (=1/16) |
| Sealing taper | 50% | 10% |
| Lip surface male element | tapered to 15% | cylindrical |
| Male end surface | straight | tapered convex ($15^0$) |

An analytical calculation of the inertia of the lips indicates a lip bending inertia 11% higher for connection A1 than for connection B. The consequence is greater stiffness in bend for connection A1 that thereby makes it possible to stress the sealing surfaces more and increase connection performance.

EXAMPLE 2

Comparison from the standpoint of the performance of the sealing surfaces of a connection of tubes with an outer diameter of 60.3 mm (2 3/8") and a thickness of 4.83 mm (4.7 lb/ft) in accordance with the invention (assembly A2) with a connection C of tubes of the same dimensions differing only in the shape of the lip.

| | A2 | C |
|---|---|---|
| Thread taper | 15% | 15% |
| Sealing taper | 50% | 50% |
| Male end surface | straight | straight |
| Male lip surface | tapered | cylindrical |
| Male lip thickness | 3.2 mm on the side of sealing<br>4 mm on the side of threading | 3.2 mm constant |
| Effective contact width male/female sealing surfaces | 1.24 mm | 1.08 mm |
| Sealing surface contact pressure | 600 N/mm | 571 N/mm |

The effective contact width and the contact pressure were determined by numerical calculation using the finite element method.

The enhanced stiffness of the lip with a tapered lip surface on connection A2 in accordance with the invention provides better contact of the sealing surfaces (+15% over the effective contact width) and enhanced surface contact pressure (+5%) with respect to connection C. Such an increase in contact pressure constitutes an appreciable improvement in connection performance.

EXAMPLE 3

Distance deviation ΔL in connections made of steel in accordance with the invention. Compliance with such a distance deviation ΔL allows one to abut the inner pair of bearing surfaces first during connection and therefore to make the functioning of the sealing surfaces reliable.

| Diameter OD tubes (mm) (") | Thickness T tubes (mm) | Weight/meter (lb/ft) | ΔL (mm) |
|---|---|---|---|
| 60.3 (2⅜") | 4.83 | 4.7 | 0.092 |
| 88.9 (3½") | 8.56 | 14.3 | 0.074 |
| 114.3 (4½") | 14.22 | 24.6 | 0.064 |

The distance deviation (ΔL) here can be given by the formula:

$$\Delta L=0.14+(3*T-1.14*OD)/1200$$

The invention also protects any other mode of embodiment that is not covered by a detailed description but that is covered by the general presentation of the invention.

What is claimed is:

1. Integral threaded connection of two metal tubes comprising a male element at the end of a first tube and a female element at the end of a second tube, the male element comprising, in a direction toward the end of the first tube, a shoulder with an annular, transverse male outer bearing surface, a tapered male threading, a male sealing surface and an annular male end surface that also comprises an end surface of the first tube, the female element comprising, moving toward the end of the second tube, a shoulder with an annular, transverse female inner bearing surface, a female sealing surface, a female tapered threading and an annular female end surface that also comprises an end surface of the second tube, the male threading being screwed into the female threading, the male sealing surface interfering radially with the female sealing surface, the male end surface forming an inner pair of bearing surfaces with the female inner bearing surface and the female end surface fonning an outer pair of bearing surfaces with the male outer bearing surface, wherein the end surfaces and bearing surfaces of each of the male and female elements comprise substantial flat surfaces which are substantially perpendicular to the axis of the connection, the male sealing surface is separated from the male threading by a lip having an external tapered lip surface having an amount of taper substantially equal to that of the male threading and having a generatrix which is substantially an extension of a tangent to thread roots of the male threading while remaining on a side of an axis of a connection with respect to said extension, the surface of the male sealing surface being one of inside of and tangent to the surface extending the tapered lip surface and wherein a distance PL between the male end surface and the male outer bearing surface is predetermined with respect to a distance BL between the female end surface and the female inner bearing surface such that during screwing of the male thread into the female thread, abutment first occurs between the inner pair of bearing surfaces prior to abutment between the first male outer bearing surface and the female outer bearing surface.

2. Integral threaded connection in accordance with claim 1 wherein a distance between the generatrix of the tapered lip surface and the extension of the tangent to the thread roots of the male threading is less than or equal to 0.20 mm.

3. Integral threaded connection in accordance with claim 1 or 2 wherein the amount of taper of the male and female threading is between 6.25 and 20% of the diameter thereof.

4. Integral threaded connection in accordance of claim 1 wherein the male sealing surface is a tapered surface whose amount of taper is greater than that of the tapered lip surface, the female sealing surface also being tapered by an amount corresponding to that of the male sealing surface.

5. Integral threaded connection in accordance with in claim 4 wherein the amount of taper of the male sealing surface (17) is between 25% and 75% of the diameter thereof.

6. Integral threaded connection in accordance with claim 1 wherein the surfaces of the male outer pair of bearing surface and female outer bearing surface are abuttable subsequent to abutment of said pair of bearing surfaces.

7. Integral threaded connection in accordance with claim 1 wherein the surfaces of the outer pair of bearing surfaces are spaced so as to almost contact each other.

8. Integral threaded connection in accordance with claim 1 wherein in an unassembled state for the male and female elements, the distance between the male end surface and the male outer bearing surface is longer than the distance between the female end surface and the female inner bearing surface by a predetermined distance.

9. Integral threaded connection in accordance with claim 8 characterized in that said distance deviation is a decreasing linear function of the outer diameter of the tubes of the connection and an increasing linear function of their thickness.

10. Integral threaded connection in accordance with claim 9 characterized in that said distance deviation is given by the formula: $\Delta L=0.14+(3*T-1.14*OD)/1200$.

11. A machining production process for forming an integral threaded connection for two metal tubes which include a male element and a female element at the end of a second tube, the male element comprising, in a direction toward the end of the first tube, a shoulder with an annular, transverse male outer bearing surface, a tapered male threading, a male sealing surface and an annular male end surface that also comprises an end surface of the first tube, the female element comprising, in a direction toward the end of the second tube, a shoulder with an annular, transverse female inner bearing surface, a female sealing surface, a female tapered threading and an annular female end surface that also comprises an end surface of the second tube, the male threading being screwed into the female threading, the male sealing surface interfering radially with the female sealing surface, the male end surface forming an inner pair of bearing surfaces with the female inner bearing surface and the female end surface forming an outer pair of bearing surfaces with the male outer bearing surface, wherein the end surfaces and bearing surfaces of each of the male and female elements comprise substantially flat surfaces which are substantially perpendicular to the axis of the connection, the male sealing surface is separated from the male threading by a lip having an external tapered lip surface having an amount of taper substantially equal to that of the male threading and having a generatrix which is substantially an extension of a tangent to thread roots of the male threading while remaining on a side of an axis of a connection with respect to said extension, the surface of the male sealing surface being one of inside of and tangent to the surface extending the tapered lip surface and wherein a distance PL between the male end surface and the male outer bearing surface is predetermined with respect to a distance BL between the female end surface and the female inner bearing surface such that during screwing of the male thread into the female thread, abutment first occurs between the inner pair of bearing surfaces prior to abutment between the first male outer bearing surface and the female outer bearing surface, which process comprises:

obtaining the bearing surface on each of the male and female elements in the same machining stage which forms the end surface of the same element.

12. Machining production process for an integral threaded connection in accordance with claim 10 which comprises machining the male end and male outer bearing surfaces, the tapered lip surface and the tapered surface encasing the crests of the male tapered threading on the male element during the same machining stage.

* * * * *

UNITED STATES PATENT AND TRADEMARK OFFICE

CERTIFICATE OF CORRECTION

PATENT NO. : 6,349,979 B1
DATED : February 26, 2002
INVENTOR(S) : Thierry Noel et al.

It is certified that error appears in the above-identified patent and that said Letters Patent is hereby corrected as shown below:

Title page,
Item [57], ABSTRACT,
Line 9, please change “a roughly” to -- an --.

Column 6,
Line 31, delete “d)”; same line, after “(20)”, delete “that”.

Signed and Sealed this

Twenty-second Day of October, 2002

*Attest:*

JAMES E. ROGAN

*Attesting Officer*

*Director of the United States Patent and Trademark Office*